Aug. 19, 1958  W. F. HOLIN  2,848,071
BRAKE RIGGING

Filed April 12, 1955  3 Sheets-Sheet 1

Inventor
William F. Holin
By
S. C. Thorpe
Attorney

Aug. 19, 1958 W. F. HOLIN 2,848,071
BRAKE RIGGING

Filed April 12, 1955 3 Sheets-Sheet 2

Inventor
William F. Holin
By
J. C. Thorpe
Attorney

Aug. 19, 1958 W. F. HOLIN 2,848,071
BRAKE RIGGING
Filed April 12, 1955 3 Sheets-Sheet 3
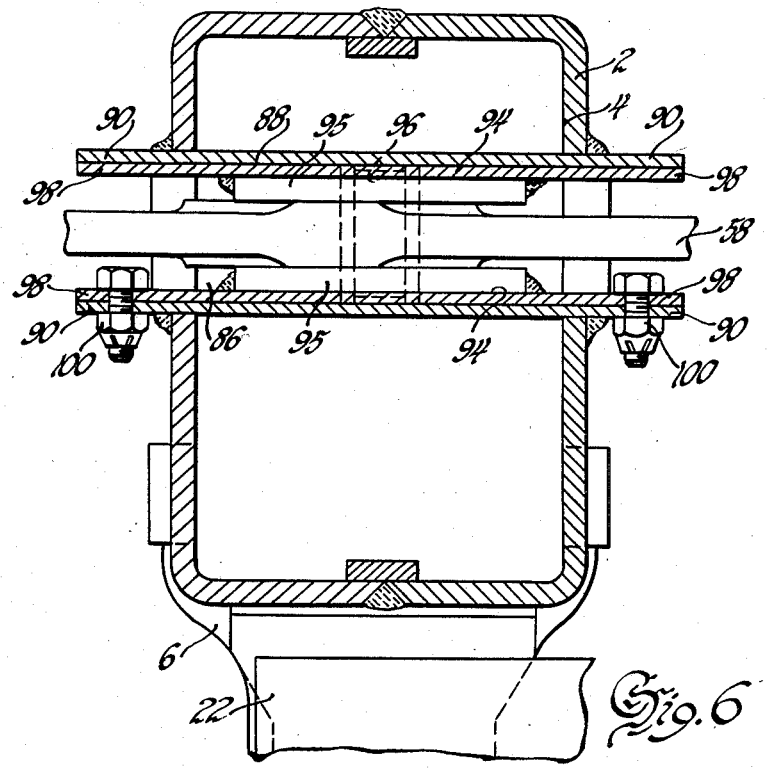
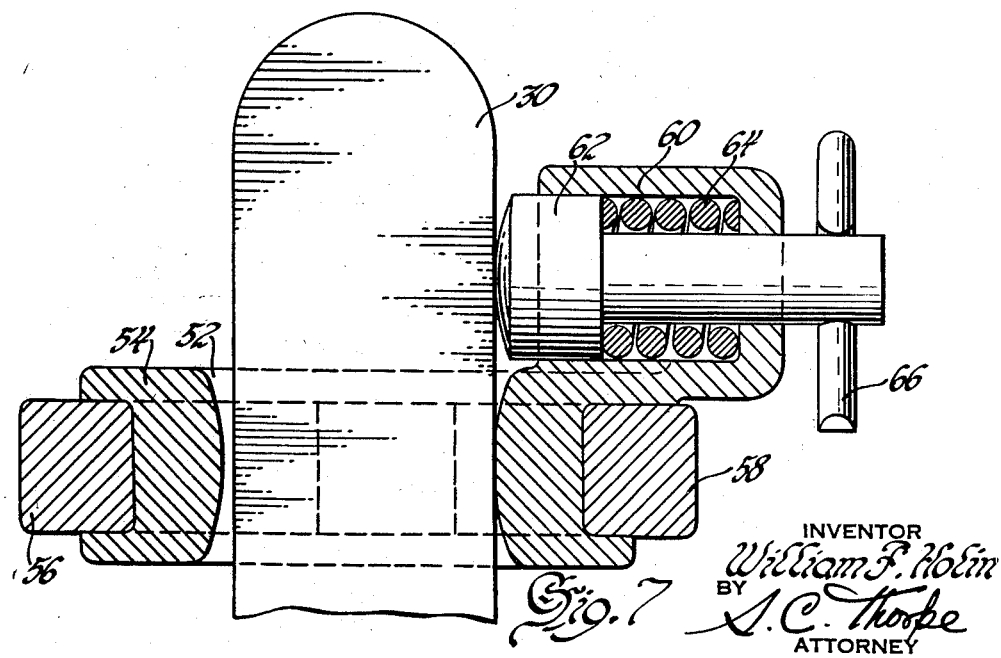
INVENTOR
William F. Holin
BY
A. C. Thorpe
ATTORNEY United States Patent Office 2,848,071
Patented Aug. 19, 1958

2,848,071

BRAKE RIGGING

William F. Holin, Riverside, Ill., assignor to General Motors Corporation, Detroit, Mich., a corporation of Delaware Application April 12, 1955, Serial No. 500,783

4 Claims. (Cl. 188—33)

This invention relates generally to brake assemblies and more particularly to brake rigging of the clasp type for railway vehicles.

One of the objects of the invention is to provide an individual clasp type brake rigging adaptable for each wheel of the vehicle.

Another object of the invention is to provide a clasp type brake rigging in which the lower ends of the vertical brake levers are anchored to the frame below the axis of rotation of the wheel and the upper ends of the levers with wheel-engaging means intermediate the ends of the levers are moved together by a double acting cylinder.

A further object of the invention is to provide novel means for quickly pivotally connecting and securing in place the horizontal brake levers on the truck frame.

Another object of the invention is to provide novel adjusting means for the lower ends of the vertical brake levers relative to the frame and the wheels of the truck for taking up slack on either side of the wheel caused by wheel or brake shoe wear.

For a clearer understanding of the above and other objects of this invention reference may be had to the accompanying detailed description and drawings, in which:

Fig. 6 is a view in section taken on the line 6—6 of Fig. 1 illustrating a novel manner of pivotally supporting and fastening certain of the horizontal brake levers to the side frame members of the railway vehicle truck.

Fig. 7 is an enlarged view in section taken on the line 7—7 of Fig. 2 illustrating the manner of connecting the upper ends of the vertical brake levers to the horizontal brake levers.

Figure 1:
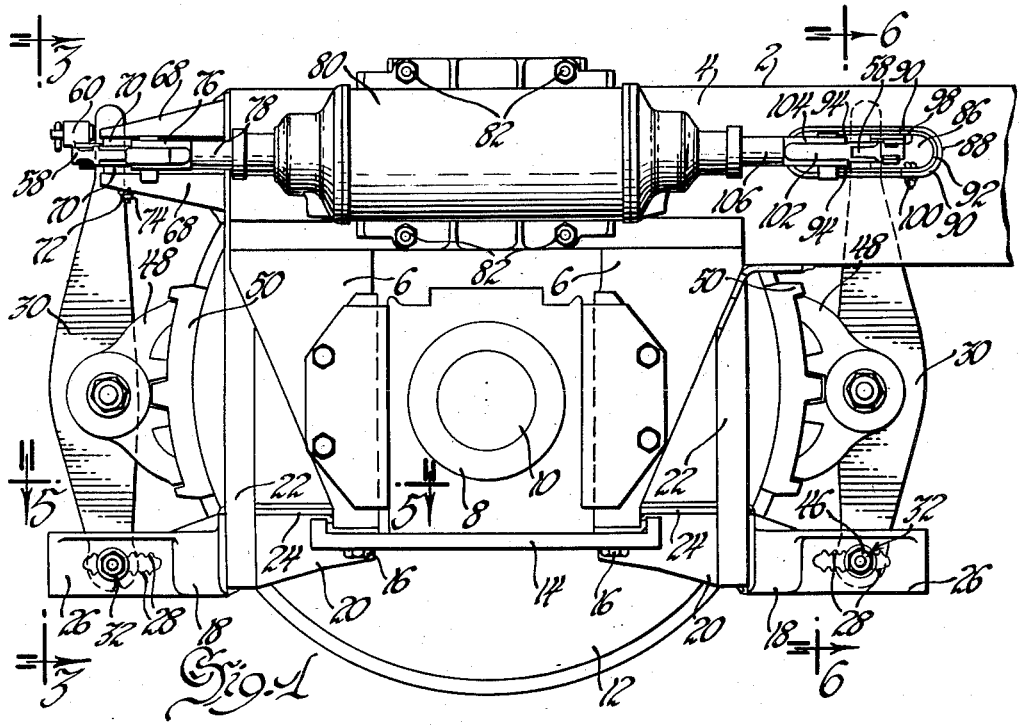
Fig. 1 is a side view in elevation of the brake rigging as applied on a railway vehicle truck.
Figure 2:
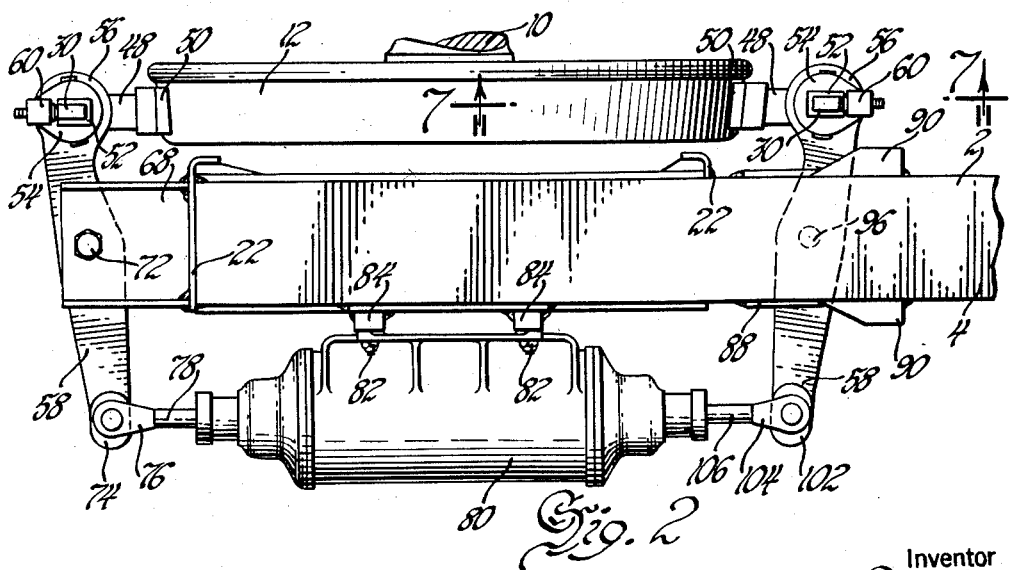
Fig. 2 is a plan view of the rigging.

Referring first to Figs. 1 and 2, it will be observed that the railway vehicle truck comprises a frame 2 including the usual pair of oppositely disposed longitudinal side frame members 4 (only one of which is shown). Connected to the side frame members 4 and depending downwardly therefrom are sets of oppositely disposed pedestals 6 between which is received a journal box assembly 8 journaling one end of a wheel and axle set including an axle 10 and wheels 12. The side frames 4 are supported on the journal boxes 8 in the usual manner and the journal boxes are retained between the pedestals 6 by a tie bar 14 secured to the lower ends of the pedestals by means of studs 16.

Figure 3:
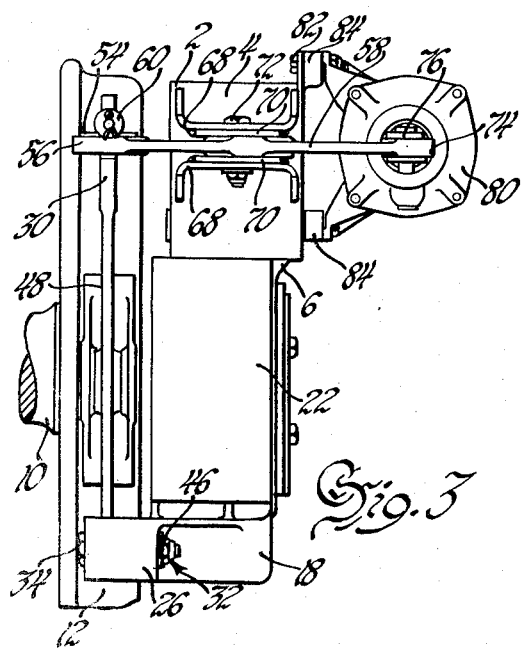
Fig. 3 is an end view in elevation taken on the line 3—3 of Fig. 1 showing in more detail one of the horizontal brake levers connecting the double acting brake cylinder to the vertical brake lever.
Figure 4:
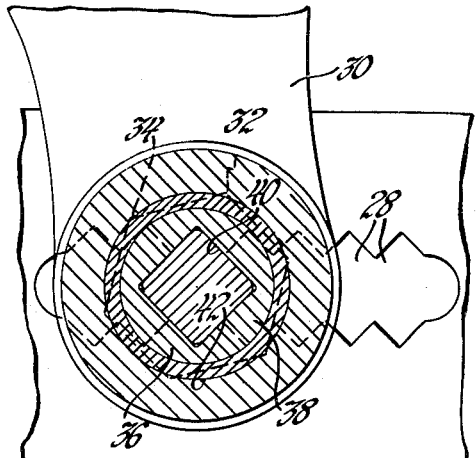
Fig. 4 is an enlarged view in section taken on the line 4—4 of Fig. 5 illustrating the pivotal connection between the lower end of one of the vertical brake levers and a unique support secured to one of the pedestals of the truck frame.
Figure 5:
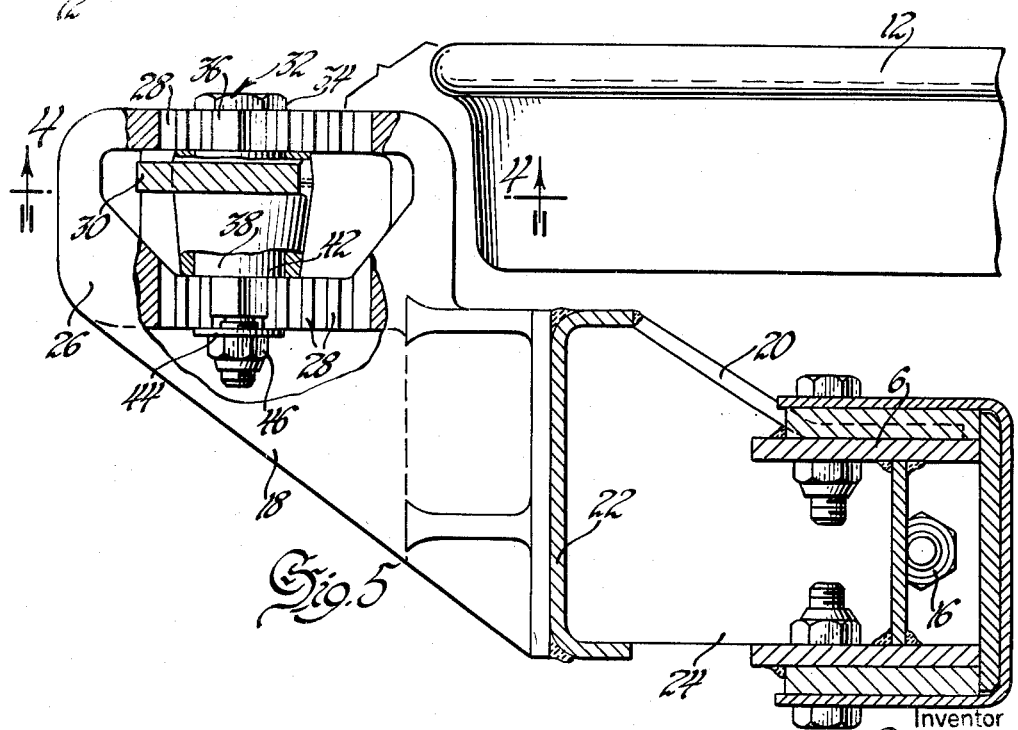
Fig. 5 is a view in section taken on the line 5—5 of Fig. 1 illustrating one of the novel supports and how the lower end of the vertical brake levers may be adjustably located in the square-shaped slots provided in these supports attached to the lower ends of the pedestals.

Referring particularly to Figs. 1, 3 and 5, it will be observed that rigidly secured to each of the pedestals 6 by means of a vertical angular plate 20 and vertical channel 22 and a horizontal plate 24 is a support or supporting assembly 18. Support 18 extends diagonally and has a portion 26 in the plane extended of the wheel 12. Portion 26 is box-like in vertical section and has a plurality of aligned polygonal (square) holes 28 in opposite sides thereof. The holes 28 in each side overlap each other and are spaced so that a defining edge of each hole intersects a defining edge of the adjacent hole. The holes 28 thus run together so as to form elongated longitudinally extending adjusting openings in the portions 26. Extending into the box-like center of the portions 26 are the lower ends of a pair of vertical brake levers 30. These lower ends are adjustably secured and supported on the portions 26 of supports 18 by means of bolt assemblies indicated generally by numerals 32. The bolt assemblies 32 each include a head 34 and a polygonal (square) shank 36 extending through a bushing 38 having a polygonal (square) hole 40 and an outer cylindrical bearing portion 42. The bushing 38 extends through the lower end of the lever 30 which is pivotally supported on the bearing portion 42. The polygonal bolt shank extends through a set of holes 28 and bushing hole 40 and is secured in place by means of a washer 44 and a nut 46 threaded on the end opposite the head 34.

As best seen in Fig. 1, the vertical brake levers 30 have pivotally connected thereto intermediate their ends the usual brake heads 48 including shoes 50 for engaging the rims of the wheels 12. As more particularly illustrated in Fig. 7, the upper ends of vertical levers 30 are received in the rectangular opening 52 of bushings 54 rotatably secured in the ends 56 of horizontal brake levers 58. To prevent rattling of the upper ends of the vertical brake levers 30, an anti-rattling device is provided which is housed in an extended portion 60 of each bushing 54. This anti-rattling device which comprises a plunger 62 loaded by means of a helical coil spring 64 is retained in the housing 60 by means of cotter key 66 engaged in the shank of plunger 62. The outer or endmost horizontal brake lever 58, i. e., the one closest to the end of the railway vehicle truck, is pivotally connected to the end of the side frame 4. This is accomplished, as observed in Figs. 1, 2 and 3, by fixing a pair of vertically spaced angular plates 68, as by welding, to the ends of the side frame members 4 and securing therebetween a pair of bearing pads 70. The horizontal brake lever is then inserted between the pads 70 and pivotally supported by means of a bolt assembly 72 extending through the members 68, the pads 70 and the lever 58. The opposite end 74 of the endmost horizontal brake lever 58 is pivotally secured in a clevis 76 connected by means of a brake cylinder rod 78 to one of the actuating pistons of a double acting brake cylinder assembly 80 of conventional design. It will be noted that the assembly 80 is mounted on the outboard side of the side frame 4 above and longitudinally between the pedestals 6. This assembly is secured by means of bolt assemblies 82 extending through spacers 84 so that the rigging may be adapted for different rail gauges in a manner to be described more particularly later.

The inner or more centrally located of the horizontal brake levers 58 is uniquely pivotally supported by the side frame 4 as follows: Spaced from the end of the side frame is an elongated hole or opening 86 which is semicircular at the ends thereof. The hole is defined by means of a fabricated flat plate assembly 88 which is provided at one end with upper and lower flaring portions 90 extending inboard and outboard of the side frame 4. The plate assembly 88 defines or forms in effect a flat tubular-like passage through the side frame member. Received within the opening 86 between the upper and lower plate portions of plate assembly 88 is a U-shaped member whose base portion 92 is shaped to be concentric with one of the ends of the assembly 88. The legs 94 of the U-shaped member rest flatly against the upper and lower plate portions of the assembly 88. Interposed between the legs 94 and oppositely disposed pads 95 is the central portion of the inner horizontal brake lever 58. This lever is pivotally secured between the legs 94 by means of a pin 96 extending through a suitable hole in the lever and through aligned holes in the upper and lower of the legs 94 as well as pads 95. The pin, it will be observed, is retained in place in the legs 94, pads 95 and in the lever 58 by the upper and lower plates of the assembly 88 when the U-shaped member and lever 58 are received in the hole 86. In order to secure the U-shaped member and lever 58 so that they cannot move laterally in the hole 86, the U-shaped member is also provided with flaring portions indicated by numerals 98, the lower of which are secured by bolt assemblies 100 to the lower of the flaring portions 90. Although not shown, if desired, the upper flaring portions on the upper leg 94 could also be secured to the upper flaring portions of the upper plate of the plate assembly 88. The opposite end 102 of the inner horizontal brake lever 58 is similarly connected to the opposite end of the double acting cylinder 80 by a clevis 104 and a brake cylinder rod 106 operatively connected to the other piston of the double acting brake cylinder assembly 80.

The operation of the rigging is as follows: Upon actuation of the brake actuating cylinder 80 the rods 78 and 106 will move axially away from each other causing the ends 74 and 102 of the horizontal brake levers 58 to move apart and the inboard ends 56 to move toward each other. Movement of the ends 56 of the horizontal brake levers 58 toward each other will cause the vertical brake levers 30 to pivot about their points of pivotal attachment to the portions 26 of supports 18 thereby carrying the brake heads 48 and shoes 50 into engagement with the rim of the wheel 12. Since the brake cylinder assemblies 80 have means which equalize the applied pressures to the operating pistons of the assembly, equal pressures will be applied to the rim of the wheel 12 on opposite sides thereof.

From the foregoing description it may now be appreciated that a unique brake assembly has been provided in which the lower ends of the vertical brake levers are adjustably fixed to the lower ends of the pedestals of the frame of the vehicle and the upper ends are moved together to clamp the wheel between the shoes provided thereon. This feature prevents the lateral swinging of the brake rigging usually found in other types of clasp brakes. In other words, the type of rigging here presented eliminates the wear which normally takes place between the tension rods and the wheels of conventional type clasp brake rigging. It will be further appreciated that this invention enables any excessive clearance between the shoes and the wheel caused by wear of shoes or wheel to be taken up by a simple adjustment of the pivotal connection between the portions 26 and supports 18 thus eliminating the costly and somewhat complex slack adjusting mechanism normally found in the "hung"-type of clasp brake rigging. By running the polygonal holes together in such a way that they overlap a large range of simplified refined adjustment is also provided. It is also emphasized that there have been provided unique assemblies for pivotally connecting the horizontal brake levers to the side frame members. These connections, along with the spacer blocks 84 and the supports 18, enable the brake rigging to be quickly relocated in different lateral positions to provide for different track-gauge trucks. This becomes increasingly important in foreign countries where the gauges between adjacent countries vary widely and it is desirable to use a particular individual wheel brake rigging for all applications.

I claim:

1. A brake rigging for a railway vehicle truck including a truck frame having a pair of downwardly depending pedestals and a wheel and axle supporting said frame, comprising a support secured to the lower end of one of said pedestals below the axis of rotation of said wheel and extending longitudinally and into the plane extended of said wheel, a vertical lever in the plane extended of said wheel having wheel-engaging means adjacent the rim of said wheel, said support having a plurality of polygonal-shaped openings spaced longitudinally therealong and overlapping each other, and an elongated fastening member having a polygonal shank portion extending onto one of said polygonal openings and having a cylindrical portion extending through the lower end of said lever whereby said lever is adjustably and pivotally supported at its lower end on said support, and means operatively connected between the upper end of said lever and said frame operative to pivot said lever on said support whereby said wheel-engaging means engages said wheel.

2. In a railway vehicle truck including a wheel and axle and a truck frame supported thereby having a downwardly depending member outboard of said wheel, brake rigging comprising a support below the axis of rotation of said wheel secured to the lower end of said member and extending into the plane of said wheel, a vertical brake lever in the plane of said wheel having wheel-engaging means adjacent the rim thereof, said support having a plurality of similar polygonal openings overlapping each other and spaced to form a single elongated adjusting opening, pivot means having a cooperating polygonal cross section received in one of said polygonal openings and having a shank portion extending through the lower end of said lever whereby said lever is pivotally supported by said support in one of a plurality of adjusting positions, and means operatively connected between the upper end of said lever and said frame adapted to pivot said lever on said support and said wheel-engaging means into and out of contact with the rim of said wheel.

3. In a railway vehicle truck including a truck frame having a pair of downwardly depending pedestals and a wheel inboard of said pedestals on an axle having an end journaled between said pedestals, brake rigging comprising a pair of oppositely disposed supports secured to the lower ends of said pedestals below the axis of rotation of said wheel and extending longitudinally and into the plane extended of said wheel, a pair of oppositely disposed vertical levers in the plane extended of said wheel having wheel-engaging means adjacent the rim of said wheel, each of said supports having a plurality of similar polygonal openings overlapping each other and spaced to form an elongated adjusting opening, and pivot means having cooperating polygonal cross sections received in a polygonal opening of each of said elongated openings and having shank portions extending through the lower ends of said levers pivotally connecting the lower ends of said levers to said supports in one of a plurality of adjusting positions, a double acting brake actuating cylinder mounted on said frame intermediate said levers and outboard of said wheel and above the axis of rotation of said wheel, and horizontal brake levers pivotally supported on said frame and extending between the operating ends of said cylinder and the upper ends of said vertical brake levers.

4. In a railway vehicle truck including a wheel and axle and a truck frame supported thereby having a downwardly depending member outboard of said wheel, brake rigging on said frame comprising a support below the axis of rotation of said wheel secured to the lower end of said member and extending into the plane of said wheel extended, a vertical brake lever in the plane of said wheel extended having wheel-engaging means adjacent the rim of said wheel, said support having a plurality of rectangularly shaped openings spaced longitudinally therealong and overlapping each other so that a defining edge of each opening intersects a defining edge of an adjacent opening, a fastening member having a rectangular shank portion received in one of said openings and a portion extending through the lower end of said lever whereby said lever is adjustably and pivotally supported at its lower end on said support, and means operatively connected to the upper end of said lever and operative to pivot said lever on said support whereby said wheel-engaging means engages said wheel.

References Cited in the file of this patent

UNITED STATES PATENTS

| | | |
|---|---|---|
| 538,054 | Traphagen | Apr. 23, 1895 |
| 605,140 | Schofield | June 7, 1898 |
| 1,559,144 | Anderson | Oct. 27, 1925 |
| 2,246,340 | Blomberg | June 17, 1941 |
| 2,343,939 | Tack | Mar. 14, 1944 |
| 2,575,379 | Benning | Nov. 20, 1951 |
| 2,579,102 | Thornburg | Dec. 18, 1951 |